Feb. 23, 1960　　　　R. M. CHRISTENSON　　　　2,926,153
PREPARATION OF INTERPOLYMERS OF BLOWN OILS AND VINYL
CHLORIDE-VINYL ACETATE MIXTURES
Filed June 27, 1957
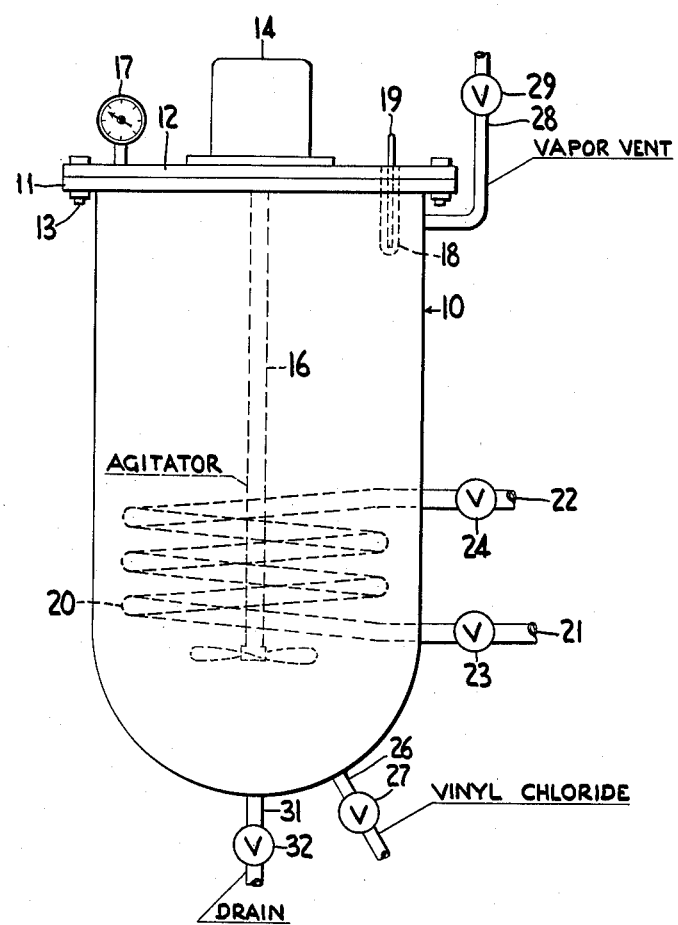
INVENTOR.
ROGER M. CHRISTENSON
BY Oscar L. Spencer
ATTORNEY

United States Patent Office 2,926,153
Patented Feb. 23, 1960

2,926,153

PREPARATION OF INTERPOLYMERS OF BLOWN OILS AND VINYL CHLORIDE-VINYL ACETATE MIXTURES

Roger M. Christenson, Richland Township, Allegheny County, Pa., assignor to Pittsburgh Plate Glass Company, Allegheny County, Pa., a corporation of Pennsylvania Application June 27, 1957, Serial No. 668,434

3 Claims. (Cl. 260—23)

This invention relates to a method of and a product from polymerization of a modified, unsaturated glyceride oil and a plurality of monomers containing $>C=CH_2$ groups. It especially concerns a method and a resultant product, wherein a blown oil which is an ester of an unsaturated higher fatty acid and a polyhydric alcohol is mass polymerized with a plurality of monomers, one of which is an ester of an alcohol and a carboxylic acid and contains a $>C=CH_2$ group, and another of which comprises a vinyl halide.

It has heretofore been attempted to prepare interpolymers suitable for use as coating media, from mixtures of (A) esters of drying oil acids and lower alcohols, such as methyl alcohol and (B) monomer systems comprising vinyl chloride and vinyl acetate.

It has also been proposed to prepare interpolymers of vinyl chloride and a blown oil. This reaction, however, has required the use of diluents such as the aromatic hydrocarbons, and usually only a small percentage of the monomer is combined in the interpolymers. The rest is distilled off. If the reaction is conducted in the absence of solvents, gelation often occurs before a satisfactory degree of polymerization is attained.

Still other attempts have been made to form interpolymers of unbodied drying oils such as linseed oil or soybean oil and mixtures of vinyl chloride and vinyl acetate. In each instance, however, the efforts were not particularly successful, inasmuch as it was found that excessive quantities of free radical initiators, or catalysts, such as benzoyl peroxide were required to induce the reaction to proceed at a reasonable rate and to a reasonable degree of completion. Also, the properties of the product were poor, inasmuch as films therefore were lacking in toughness and other desired mechanical properties.

This invention is based upon the discovery that highly satisfactory interpolymers suitable for use as coating media can readily be obtained by interpolymerization under heat and pressure such as is autogenously generated in the mixture and in the substantial absence of diluents, such as aromatic hydrocarbons, of an interpolymerizable mixture of (A) a blown ester of an unsaturated glyceride oil acid and a polyhydric alcohol (B) an essentially binary monomer system embodying the group

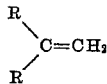

in which at least one group R is halogen and the other is halogen or hydrogen and (C) an ester of a vinylic or allylic alcohol containing a $>C=CH_2$ group and a carboxylic acid.

When mixtures of the foregoing constituents are heated together under pressure without added solvents, even relatively mildly and in the presence of but moderate amounts of catalysts, the reaction proceeds to a satisfactory degree of completion in a reasonable time. It is thus quite practicable to combine above 30 percent by weight of the monomers employed. These percentages may extend to 45 percent or more. These yields can be obtained with or without added diluents.

The interpolymers comprise a blown, drying glyceride oil, a vinyl or allyl ester of a carboxylic acid and a vinylic halide, all in a single homogeneous product, soluble in, or compatible (even at high solids level) with the solvents and modifying agents commonly employed in paints and lacquers. They combine many of the advantages of the oil and of the monomers in single materials. For example, films of the material have improved physical properties as compared with the oil alone, or the copolymers of vinyl acetate and vinyl chloride. At the same time, the product is of such solubility in hydrocarbon solvents as to permit its use in regular paint and lacquer formulations at a high level of solids content. Films prepared from solutions of the interpolymers, dry both by evaporation of solvent and by cross-linking action between contiguous molecules. The films are clear, hard and possess outstanding chemical resistance, particularly to alkalis; but they are well plasticized internally so that there is no need of added plasticizers; loss of plasticity by evaporation of plasticizer is thus avoided. All of the components of this interpolymer are relatively inexpensive, so that the overall cost is low.

The presently preferred halogen-substituted monomer is vinyl chloride which can be obtained at relatively moderate expense. However, vinylidene chloride and other halogenaceous compound containing a

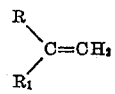

group, where R is a halogen such as chlorine and $R_1$ is halogen, hydrogen, methyl, or the like, are included within the scope of the invention.

Vinyl acetate is presently considered to be the least expensive and generally most satisfactory of the unsaturated ester monomers which may be admixed with vinyl halides and copolymerized with a blown drying or semi-drying oil; but other carboxylic acid esters containing a $>C=CH_2$ group in terminal position and being compatible with, or soluble in the blown oil-vinyl chloride mixture may be employed. These include vinyl esters such as a vinyl acetate, vinyl acrylate, vinyl propionate, vinyl benzoate and other vinyl esters containing 10 carbon atoms or less, and even esters of higher fatty acids such as vinyl stearate, oleate, linoleate, and the like.

Free carboxylic, unsaturated acids, such as acrylic and methacrylic acid may be added in small amounts (about 1 to 5 percent based on the polymerizable mixture) to give increased adhesion.

The permissible proportions of the several components of the interpolymerizable system are susceptible of variation over a relatively wide range. The extreme limits will vary with different blown oils, with different vinyl or vinylidene halides and with different esters containing the terminal $>C=CH_2$ group. However, with vinyl chloride and vinyl acetate as the monomer components, the upper limit of vinyl chloride in the mixture of the two, appears to be approximately 80 percent by weight; the lower limit is about 20 percent and the remainder of the monomer mixture, of course, being the other monomer or monomers. Good results have been attained with monomer systems containing 75 percent by weight of either vinyl chloride or vinyl acetate, the remainder (25 percent by weight) of the monomer system being the other component. The present invention includes each and all of the intermediate compositions of monomers within those limits. Those containing approximately equal parts by weight of vinyl halide monomer and ester monomer appear to be near the optimum.

The proportions of blown oil in the polymerization charge are also susceptible of variation. The proportion of blown oil should fall within a range of about 10 to 30 percent by weight based upon the total interpolymerizable mixture of blown oil, vinyl halide and unsaturated ester; the optimum for most of the more common blown oils being within a range of 15 to 20 percent (percentages by weight) upon a like basis.

Temperatures of interpolymerization of about 50 to 100° C. are generally employed; the temperatures lower than about 50° C. tend excessively to slow the reaction rate, while temperatures in excess of 100° C. might decompose the reactants or gel the product.

Reaction times may be varied, dependent upon the catalyst or initiator, the amount thereof, the temperature of interpolymerization, and the characteristics desired in the product. A period of 1 to 30 hours is considered to meet most requirements.

The starting oils, which when blown, are employed in the preparation of the products of this invention, preferably, are of the drying or semi-drying type, and include substantial amounts of acid radicals containing a plurality of ethylenic groups in the glyceride molecules. The most common of these are linseed oil and soya oil; but others including a reasonable degree of unsaturation in the hydrocarbon portions of the fatty acid radicals or groups, may be employed. For example, cottonseed oil, safflower oil, and others, include a high percentage of fatty acid radicals which contain a plurality of double bonds and they are, therefore capable of cross-linking by oxidational polymerizations characterizing drying oils, and may be employed in the process of this invention.

For use in accordance with this invention, these oils are bodied by blowing with air or oxygen, until a reasonably high viscosity is attained. The viscosity may, for example, range between E and $Z_4+$ as determined upon the Gardner-Holdt scale, but oils of somewhat lower viscosities are also included. The upper range of viscosity should not extend so high as to induce incompatibility between the blown oil and the monomer system, or to introduce a danger of premature gelation upon heating the mixture. Usually, the peroxide values of these blown oils will be comparatively high, for example, within a range of about 25 to 700 and preferably within an intermediate range of about 200 to 600 or 690.

At the conclusion of the interpolymerization reaction, uncombined monomers are distilled and recovered.

A wide variety of blown, or oxidized oils are adapted for use in the preparation of interpolymers with vinyl halides and vinyl esters in accordance with the provisions of the present inventions. The blown oil may be commercially blown products prepared, for example, by blowing the oil with air at temperatures around 93 to 140° C. until increased viscosity and higher peroxide value are attained. Oils which have been oxidized by other methods, for example, by spraying them into an oxidizing atmosphere, or by other methods, are also included. Oils blown at rather low temperatures, e.g. below 200° F. in the absence of added catalysts and for considerable periods of time, are often preferred. For purposes of the present invention, blown oils were prepared as follows:

BLOWN OIL "A"

Linseed oil was blown with air at a temperature of 70° C. for 54 hours, at which point, it had an increased viscosity and a peroxide value of 515. This oil could be interpolymerized with vinyl chloride and vinyl acetate in accordance with the provisions of this invention.

BLOWN OIL "B"

Soya oil was substituted for linseed oil in the foregoing procedure. The product was of increased viscosity and had a peroxide value of 529 and was suitable for use in accordance with the provisions of this invention. The blown oil could be interpolymerized with vinyl chloride and vinyl acetate to provide a homogeneous product.

BLOWN OIL "C"

The oil in this instance was again of linseed and was blown with air at 70° C. for 87½ hours at which time it had a viscosity of $Z_3$ and a peroxide value of 307. Additional samples of the same oil, similarly blown, for periods of 58 and 58½ hours respectively, had viscosities of U+ and T+ respectively, and peroxide values of 373 and 339, respectively. They also were useful in the practice of this invention.

BLOWN OIL "D"

The oil again, was linseed oil and was employed in a charge of 36 pounds. The oil was heated to 70° C. without catalyst and was blown with air at a rate of 14 cubic feet per minute for 37½ hours. At the conclusion of this time, it had a viscosity of Z+ and a peroxide value of 534.

Similar oil, in an amount of 35.5 pounds, blown in similar manner for 28½ hours had a viscosity of O+ and a peroxide value of 485.

Three additional charges, the first two of 35.5 pounds, the third of 34.5 pounds, all of linseed oil, were blown at 158° F. with 14 cubic feet of air per minute, respectively, for 28½ hours, 31½ hours and 32½ hours to provide blown oils of viscosities respectively of O+, V+ and Q, and peroxide values of 485, 522 and 468 respectively.

Samples of these blown oils and of commercial products blown at 235° F. to viscosities of D to E, S and $Z_2$ to $Z_3$ (peroxide values of 38, 42 and 68), were mixed with vinyl chloride and vinyl acetate and subjected to interpolymerization in accordance with the provisions of this invention and as illustrated by the subsequent examples.

The foregoing blown oils can be interpolymerized with vinyl halides such as vinyl chloride and unsaturated monomer esters such as vinyl acetate, to quite a substantial degree, even in the absence of added free radical initiators or catalysts. However, it will be understood that in most instances, higher percentages of combined monomers and more complete interpolymerization are obtained by the addition of a small amount of a free radical initiator or catalyst. Appropriate catalysts of the peroxide type include benzoyl peroxide, peracetic acid, isopropyl percarbonate, methyl ethyl ketone peroxide, cumene hydroperoxide, tertiary butyl hydroperoxide, lauroyl peroxide and many others. Persulfates, such as potassium persulfate, diazocompounds, or the like may be employed to catalyze the reaction. Where catalysts of this type are to be added to the interpolymerizable mixture of blown oil and monomers such as vinyl chloride and vinyl acetate, the amount of catalyst is seldom, if ever, as great as is required in order to attain a reasonable degree of interpolymerization between esters such as methyl ester of drying oil acids and the monomers, or between unbodied, or unblown oil and the monomers. A range of about 0.5 to 5 percent by weight based upon the interpolymerizable mixtures is usually satisfactory.

It is an advantage of the present process, that the reaction products are usually of reasonably low color and this is especially true if the reaction is conducted at a moderate temperature, for example, at a value below about 75° or 80° C. or for a short period of time. However, in the event that coating materials of very light color are desired, or if relatively high reaction temperatures are used, it is permissible to conduct the reaction in the presence of stabilizers which, although they do not have any substantial effect upon the course of interpolymerization between the components of the reaction mixture, do tend to reduce the reactions which are responsible for the discoloration of the product. Appropriate inhibitors of discoloration in the interpolymerization reaction include halogen acceptors such as the commercial product RN-34 sold by Shell Chemical Company. This is understood to contain a liquid glycidyl polyether product of low molecular weight obtained by the condensation of para-paraisopropylidenediphenol and epichlorohydrin, or similar materials. Still another stabilizer against discoloration is a commercial product sold by the Advanced Solvents Corporation under the trade name of XB-12. This is understood to contain tin dilaureate. Lead naphthenate is, also, useful in a like capacity. These stabilizers may be employed in substantially any desired amount, but since they are comparatively expensive ingredients, it is usually preferred to employ them in a minimal quantity to attain reasonably low color. Often, as previously stated, they may be completely eliminated.

Various embodiments of apparatus may be employed in conducting the interpolymerization reaction between blown unsaturated glyceride oil and a monomer mixture comprising vinyl chloride and a vinyl ester such as vinyl acetate. Such apparatus should be adequate to retain the autogenously generated pressure. The apparatus may comprise an elongated pressure tube provided with appropriate heating apparatus and through which a solution of the blown oil, the two monomers and preferably a catalyst of interpolymerization are fed at a rate to obtain a desired period of reaction. Solution is passed in at one end while the interpolymer together with any unreacted constituents, are drawn off at the other.

Likewise, it is not precluded to react the mixture in an apparatus comprising a kettle or other appropriate container equipped with an agitator or a shaker, heating means, a cover and other conventional appurtenances designed for the interpolymerization of vinyl chloride and vinyl esters.

Such apparatus is illustrated in the drawing in which the single figure diagrammatically illustrates a pressure container such as an autoclave equipped with the necessary adjuncts for conducting the reaction.

In the apparatus as shown, a container 10 is indicated as being provided with a peripheral flange 11 at its upper edge and a cover 12 which may be secured to the flange as for example by means of bolts 13. The container may be formed of iron or steel or other material adapted to withstand pressures which may be developed autogenously in the course of the reaction. If utmost purity of product is desired, the container may be of stainless steel, or may be common steel or iron having a glaze or other coating.

The reaction mixture in the container preferably should be subjected to agitation during the course of reaction and to this end, the cover 12 which is preferably dished, is provided with a motor 14 driving an agitator 16. The apparatus should also include a pressure gauge 17 which as shown, is mounted upon the cover 12, but may be disposed in other convenient location. Means to determine temperatures within the apparatus comprises conventional well 18, extending downwardly from the cover and being designed to contain a temperature measuring device such as a thermometer 19.

Means to maintain reaction temperatures within the container 10 comprises a tubular coil 20 having inlet 21 and outlet 22 for the circulation of a heating medium such as hot water or steam. The inlet and outlet are provided with valves 23 and 24 whereby the rate of circulation of heating medium may be adjusted. Obviously, the container could also be heated by other means such as electrical resistance elements disposed internally of the container or in jackets. For purposes of introducing the vinyl halide component into the reaction vessel, the container may also be provided with inlet conduit 26 having a valve 27 for the control of the flow of fluid into the reaction zone.

Means to permit the escape of excess volatile materials at the conclusion of the reaction is indicated as comprising a conduit 28 connected to the container at, or near the upper extremity thereof and being provided with a valve 29 which normally will be maintained in closed position during the course of the reaction, but which may be opened when it is desired to bleed off unreacted constituents or other volatile materials.

If desired, the container may also be provided near its lower extremity with an outlet conduit 31, by means of which reaction product can be discharged at the end of the reaction to any convenient container. This conduit is likewise provided with a valve 32 by means of which the conduit can be closed during the normal course of the reaction.

It will be apparent that the evaporation of volatile constituents from the reaction product can be conducted while the mixture is in the container 10 or if preferred, the mixture may be discharged and then subjected to distillation in an appropriate apparatus (not shown).

This apparatus is suitable for use in the reactions as disclosed in each of the subsequent examples. The pressures will normally be those developed autogenously by the reactants, e.g., the vinyl chloride at the temperatures employed. This pressure is about 150 to 250 p.s.i., but varies dependent upon the reaction temperature and the stage of the reaction. It tends to fall as the reaction progresses. Additional mechanical pressures may also be applied but usually are not necessary.

Specific applications of the principles of the invention are illustrated by the following examples:

*Example I*

For purposes of comparison, an interpolymer, herein designated as (A) of methyl esters of soya oil acids, vinyl chloride and vinyl acetate was prepared. This composition comprised 10 grams of the methyl ester of linseed oil, 20 grams of vinyl chloride and 20 grams of vinyl acetate. The mixture was stabilized against discoloration with 0.54 gram of a liquid glycidyl polyether already described, and was catalyzed with 1 gram of benzoyl peroxide. It was polymerized in a closed container for 16 hours at 100° C. under pressure autogenously generated, and free monomers were distilled. Films from this material were clear, but very brittle.

For purposes of further comparison, an interpolymer (B) of unblown soya oil, vinyl chloride and vinyl acetate was prepared, comprising 10 grams of the oil and 20 grams each of vinyl chloride and vinyl acetate, and 0.54 gram of glycidyl polyether stabilizer. The mixture was catalyzed with 1 gram of benzoyl peroxide and heated for 16 hours at 95° C. under autogenously generated pressure; free monomers were then distilled. Films of this material, when spread and dried, though clear, were soft and of little value.

Still further for purposes of comparison, an interpolymer (C) of unblown linseed oil and a mixture of vinyl chloride and vinyl acetate was prepared comprising 10 grams of the oil and 20 grams each of the two monomers. The mixture was stabilized with 0.54 gram of the stabilizer employed in B, was catalyzed with 1 gram of benzoyl peroxide and heated for 16 hours at 95° C. Uncombined monomers were distilled as above. The product was cloudy and films thereof, though clear, were soft and weak.

In accordance with the provisions of this invention an interpolymerizable mixture (D) was then formulated, consisting of 100 grams of soya oil; blown to a viscosity of J and a peroxide value of 529, 500 grams of vinyl chloride and 500 grams of vinyl acetate. This material was also stabilized with the polyether stabilizer, and was catalyzed with benzoyl peroxide, both in the same ratios with respect to the other compounds, specified in the case of the methyl esters and the unblown oil. The mixture was heated for 15 hours at 80° C. under pressure autogenously generated and excess monomers were distilled to give a clear homogeneous solution. Films of this material dried to a clear state and unlike those above described, they were tough, and flexible.

Similarly, charge (E) was prepared comprising: 10 grams of linseed oil which had been blown to a viscosity of $Z_4$ and a peroxide value of 515, 20 grams of vinyl chloride and 20 grams of vinyl acetate, stabilized with 0.5 gram of the polyether stabilizers, and catalyzed with 0.5 gram of benzoyl peroxide. The mixture was interpolymerized for 15 hours at 80° C. under the presure of reaction. The resultant product was clear and homogeneous. When spread as a film, it dried to a clear, hard, flexible state. The interpolymers D or E from blown oils obviously were much superior to the interpolymers A, B or C, prepared for purposes of comparison from methyl esters of drying oil acids or from unblown soya or linseed oils.

*Example II*

In this example, blown soya oil having a viscosity of J and a peroxide value of 529 was employed. The interpolymerizable mixture comprised 10 grams of the oil and 20 grams each of vinyl chloride and vinyl acetate. The mixture was stabilized with 1.25 grams of the polyether stabilizer of Example I, and was catalyzed with 0.5 gram of benzoyl peroxide. It was then heated for 15 hours at 97° C. under autogenously generated pressure. Uncombined monomer was distilled off under vacuum, to provide a product containing 54.6 percent combined monomer. The product gave clear films.

*Example III*

This example is essentially a repetition of Example II, except that the stabilizer in an amount of 1.5 grams is employed. The benzoyl peroxide content is increased to 1 gram. The product contains 65.6 percent of combined monomer. About 37 percent of the total monomer is combined. Films of this material are clear and homogeneous, but possess a very slight tack.

*Example IV*

In this example, soya oil corresponding to that of Examples II and III was employed, but in an amount of 10 grams. To it were added 20 grams of vinyl chloride and 20 grams of vinyl acetate. The mixture was stabilized with 1 gram of polyether stabilizer; but no catalyst was added. The mixture was heated at 97° C. for 15 hours, under autogenously generated pressure and uncombined monomer was distilled off. This product, when spread and dried, provided films which were clear, and flexible. While the percentage of combined monomer (31.7 percent) in the product is rather low, the example shows that an interpolymer can be formed without adding catalyst. The yield is much enhanced if catalyst is added.

*Example V*

In this example, a blown linseed oil which was a commercial product and which had been blown at 235° F. to a peroxide value of 41 and a viscosity of S was employed; 500 grams of this blown linseed oil was mixed with 500 grams of vinyl acetate and 1500 grams of vinyl chloride. The mixture was catalyzed with 50 grams of benzoyl peroxide and was heated for 8 hours at 167° C. under autogenously generated pressure. Uncombined monomer was distilled from the product. The product contained 51.3 percent of combined monomer and a solution in xylene of a solids content of 50.2 percent by weight, had a viscosity of H.

*Example VI*

The oil component of this mixture was blown linseed oil of a viscosity of $Z_4+$ and a peroxide value of 515 and was prepared as previously described; 10 grams of this oil, 20 grams of vinyl chloride and 20 grams of vinyl acetate were mixed with 1 gram of the stabilizer previously mentioned; but no catalyst of polymerization was added. The mixture was heated for 15 hours at 97° C. under autogenously generated pressure, and uncombined monomer was distilled to provide a clear, homogeneous product which, when spread and dried, formed a clear, but very slightly tacky film. The combined monomer content of the material was 31.6 percent. The example further shows that the reaction proceeds to a considerable degree without addition of catalyst, but is more satisfactory with added catalyst.

*Example VII*

This example is essentially a repetition of Example VI, but with the addition of 0.5 gram of benzoyl peroxide to the interpolymerizable mixture. The resultant product was a clear, homogeneous material in which contained 51.8 percent of combined monomers. Films from this material when baked at 285° F. for 45 minutes were clear, flexible and hard. They had an impact value of over 22 inch pounds.

*Example VIII*

This example is also a repetition of Example VI except that the interpolymerizable mixture was catalyzed with 1 gram of benzoyl peroxide. The resultant product was a clear, homogeneous solution of a combined monomer content of 61.2 percent by weight. The product was catalyzed with a commercial drier containing 0.3 percent by weight of lead and 0.03 percent by weight of cobalt and was spread and air dried to provide a clear, flexible film of a Sward hardness of 10 on a glass panel, an impact resistance of 22 inch pounds and a flexibility of 20 percent on a conical mandrel.

*Example IX*

In order to demonstrate the effects of eliminating the vinyl acetate component, a mixture was prepared comprising blown linseed oil of a peroxide value of 373 and a viscosity of U+. The apparatus was a pressure apparatus in which the pressure was autogenously generated, as previously described. The charge comprised:

| | Grams |
|---|---|
| Blown linseed oil | 10 |
| Vinyl chloride | 40 |
| Benzoyl peroxide | 1 |

The mixture was maintained at 75° C. for 15 hours. A gel was formed which was useless as a coating medium.

This test was repeated with a charge comprising:

| | Grams |
|---|---|
| Blown oil (same as described) | 10 |
| Vinyl acetate | 5 |
| Vinyl chloride | 35 |
| Benzoyl peroxide | 1 |

The charge gelled before it was done.

*Example X*

This is essentially a repetition of Example IX except that 20 grams each of vinyl chloride and vinyl acetate were employed. The resultant product was a clear, homogeneous solution containing 59.1 percent of combined monomer. At a solids content of 46.3 percent in xylene, it has a viscosity of H. This product when sprayed and baked for one hour formed clear, flexible films.

*Example XI*

The conditions in this example corresponded to those of Example IX except that the relative proportions of vinyl chloride and vinyl acetate were reversed, being respectively 10 and 30 grams.

The resultant product was a turbid solution, containing 58.2 percent by weight of combined monomers. At a solids content of 42.8 in xylene, it had a viscosity of P. Films when baked at 300° F. had a Sward hardness of 10 and good flexibility.

Example XII

This example comprises a series of tests which constitute a further demonstration of the effects of omitting vinyl acetate as a comonomer from an interpolymer of blown oil and vinyl chloride.

TEST A

In the first test, a solvent (toluene) was employed and the temperature of the bomb was increased to 120° C. The reaction charge comprised:

| | Grams |
|---|---|
| Vinyl chloride | 60.03 |
| Blown linseed oil | 12.6 |
| Toluene | 27.48 |
| Benzoyl peroxide | 2.4 |

The mixture was heated at 120° C. for a period of 2 hours. The solvent (toluene) and excess vinyl chloride were stripped under vacuum. The conversion upon the basis of vinyl chloride was 36 percent. The combined monomer content of the product was 62 percent.

In spite of the use of solvent (toluene) to dilute the reaction mixture, the resultant product was quite brown in color giving a Gardner-Holdt reading of 14 to 15. It was apparent that the color was undesirably high for some purposes.

Apparently, the relatively dark color was due to the high temperature at which interpolymerization was conducted. This material, when contrasted with that obtained by interpolymerizing blown glyceride drying oil, vinyl chloride and vinyl acetate in accordance with this invention, is much darker.

TEST B

In order to demonstrate the effects of reducing the temperature of interpolymerization, a second mixture was prepared which was substantially identical with that of Test A.

This mixture was heated in a bomb for a period of 2 hours at a temperature of 75° C.

The resultant product was of light color. However, films thereof upon a glass panel, did not air dry over a period of two hours. When the films were baked at 250° F. for 30 minutes, they likewise did not dry, but remained tacky. The films were quite hazy, indicating incompatibility of the components thereof. It appeared that the interpolymerization, at a temperature of 75° C., did not proceed satisfactorily. Materials comprising interpolymers of vinyl acetate and blown oil, prepared in accordance with the provisions of this invention, air dry or bake to form clear, hard, tough films.

TEST C

The foregoing test was repeated but the time of interpolymerization in the bomb was increased to 4 hours. The resultant product was again of a light color but films thereof did not air dry satisfactorily and remained soft and tacky and likewise did not adequately dry when baked for 30 minutes at 250° C. but also remained soft and tacky. The films were quite hazy, indicating incompatibility. Moreover, a definite "seedy" appearance, indicating separation of polymers in the mixture, was evident in the latter. Apparently, increase of the time of heating would increase the "seedy" effects in the films.

TEST D

In a still further test, samples were prepared comprising blown linseed oil, vinyl chloride, and toluene, and benzoyl peroxide, and being of the composition:

| | Grams |
|---|---|
| Vinyl chloride | 60 |
| Blown linseed oil | 12.5 |
| Toluene | 27.5 |
| Benzoyl peroxide | 2.4 |

The mixture was heated in a bomb at 80° C. for 15.0 hours. The material was of light color, but was gelled and was useless as a coating medium.

From tests A, B, C and D, it was concluded that by interpolymerizing vinyl chloride and blown linseed oil without vinyl acetate at high temperature, but in the presence of a diluent, a product of poor color resulted. If the temperature of interpolymerization was reduced, interpolymerization did not proceed satisfactorily. The films from materials which had been heated at a lower temperature for a short time, did not cure satisfactorily. Longer heating at the lower temperature resulted in incompatibility of the components of the resin product and heating, if continued for a still longer time resulted in gellation.

In contrast, interpolymers of vinyl chloride, vinyl acetate and blown oil prepared by mass polymerization were clear and of light color. They cured readily and did not gel prematurely. The films were hard and adherent.

Example XIII

In this example blown linseed oil of a viscosity of O+ and a peroxide value of 485 was employed; 10 grams of this oil was mixed with 20 grams of vinyl chloride and 20 grams of vinyl acetate which had been distilled for purposes of removing any added polymerization inhibitor which might have been originally added thereto to improve storage life. The mixture was catalyzed with 1.0 gram of benzoyl peroxide and was heated under pressure for 15 hours at 71° C. Uncombined monomer was distilled to provide a clear yellow, homogeneous product, containing 57.3 percent of combined monomer. The product had a viscosity of B+ at a solids content of 44.6 percent by weight and was useful as a coating medium.

Example XIV

In this example, blown linseed oil, identical with that in Example XIII, in an amount of 10 grams was mixed with 20 grams of vinyl chloride and 20 grams of vinyl acetate. The mixture was catalyzed with 1 gram of benzoyl peroxide and was heated for 15 hours at 100° C. When uncombined monomer was distilled, the resultant product was a clear, homogeneous solution containing 47.4 percent of combined monomers. At a solids content of 55 percent by weight, this material had a viscosity of F+. It could be used to coat metals. Conditions were not optimum, seemingly the temperature was too high.

Example XV

The blown oil of this example was linseed, having a viscosity of O+ and a peroxide value of 485; 10 grams of the oil was mixed with 20 grams of vinyl chloride and 20 grams of vinyl acetate. The mixture was catalyzed with 1.5 grams of cumene hydroperoxide and 0.5 gram of the polyether stabilizer. The mixture was heated for 2 hours at 125° C. to provide a clear, homogeneous product of a viscosity of A— at a solids content of 39.5 percent, and of combined monomers content of 37.9 percent. The product was useful as a coating medium. Apparently, the temperature was too high for maximum combined monomer content.

Example XVI

This example is essentially a repetition of Example XV, but 0.5 gram of a tin dilaureate, sold commercially as XB-12 was used as a stabilizer. The resultant product contained 52.3 percent of combined monomers and was clear and homogeneous, though dark in color. At a solids content of 59.5 percent, the viscosity of this material was F+. It could be used as a coating medium.

Example XVII

The oil of this example was linseed, blown as previously described, to a Gardner-Holdt value of Q and a peroxide value of 468; 10.5 grams of this oil was mixed with 17.85 grams of vinyl acetate and 41.65 grams of vinyl chloride. The mixture was catalyzed with 1.05 grams of benzoyl peroxide and was reacted for 15 hours at 75° C. under autogenously generated pressure. When uncombined monomer was distilled, it provided a clear solution, or product which contained 70.7 percent combined monomers. About 42.7 percent by weight of the total monomers was combined. This material, at a solids content of 55.7 percent, had a viscosity of W and was a coating medium.

*Example XVIII*

This example is essentially a repetition of Example XVI except that the added benzoyl peroxide is increased to 1.4 grams. The resultant product contains 72.9 percent combined monomers. About 46.7 percent by weight of the total monomers is combined. The viscosity is W+ at a solids content of 50.1 percent in xylene.

*Example XIX*

The oil of this example was bodied soya oil of a viscosity of O+ and a peroxide value of 664. The charge consisted of 14 grams of this oil, 14 grams of vinyl acetate and 42 grams of vinyl chloride. The mixture was catalyzed with 1.4 grams of benzoyl peroxide and was then heated under autogenously generated pressure for 15 hours at 75° C. When uncombined monomers were distilled, the product was clear and homogeneous. The combined monomer content was 67.7 percent, about 45 percent of the total monomer was in the product. At a solids content of 57.7 percent, it had a viscosity of Y. The material was catalyzed with 0.3 percent by weight of lead and 0.03 percent by weight of cobalt. The catalyzed interpolymer was spread on test panels and air dried to a Sward hardness of 8. The films were flexible and of good alkali resistance.

*Example XX*

It is an advantage of this invention that the reaction can be conducted in the absence of diluents such as aromatic hydrocarbon. Substantial cost reductions can thus be attained. However, the reaction of blown drying or semi-drying oil with a mixture of vinyl chloride and vinyl acetate as the monomers, can also be conducted in the presence of diluents, if so desired. This example illustrates the use of such diluent.

The interpolymerizable mixture comprised 10 grams of linseed oil, blown to a viscosity of $Z_4+$ and a peroxide value of 515, 20 grams vinyl chloride and 20 grams of vinyl acetate. The mixture was diluted with 20 grams of xylene, was stabilized with 1 gram of the polyether stabilizer (RN34) and was catalyzed with 1 gram of benzoyl peroxide.

To the mixture, was also added 0.5 gram of acrylic acid designed to give increased adhesion to surfaces such as metals. The temperature of interpolymerization was 76° C.; the time was 15 hours. The pressure was that autogenously generated. Unreacted monomer was distilled to provide a solution which was clear and contained 63.5 percent by weight of combined monomers. This represents 41 percent of the total monomer used. The material could be used to coat surfaces such as metals.

*Example XXI*

The interpolymer in this example comprised:

| | Grams |
|---|---|
| Linseed oil blown to a peroxide value of 515 | 100 |
| Vinyl acetate | 200 |
| Vinyl chloride | 100 |
| Benzoyl peroxide | 5 |
| RN34 stabilizer | 5 |

This mixture was heated for 15 hours at 80° C. and under autogenously generated pressure to provide a product containing 54.3 percent by weight of combined monomer (this is about 39 percent of the total monomer in the product) and having a viscosity of U—V at a solids content of 54.5 percent by weight in xylene. The product was of a color of 8 on the Gardner scale.

The material was incorporated with a conventional drier to provide a composition containing 0.3 percent by weight of lead and 0.03 percent by weight of cobalt calculated as active metal. The catalyzed material was spread to provide test films upon panels of glass and of steel and the films were air dried. The films, on glass, were of a Sward hardness of 6 and upon steel of a Sward hardness of 8. The flexibility upon a conventional conical mandrel was 20 percent or greater. The impact resistance was 33 inch pounds as measured with a ½ inch steel ball.

*Example XXII*

In this example, an interpolymer of the following composition was prepared:

| | Grams |
|---|---|
| Linseed oil blown to a peroxide value of 515 | 250 |
| Vinyl acetate | 500 |
| Vinyl chloride | 500 |
| Benzoyl peroxide | 25 |
| RN34 stabilizer | 25 |

The mixture was heated at 80° C. for 15 hours under autogenous pressure to provide a product having a viscosity of $Z_5$ to $Z_6$ and a Gardner color of 9 to 10 at 52.6 percent solids in xylene. The combined monomer content was 62.2 percent by weight. About 32 percent of the total monomer was in the product. Films of this material upon glass had a Sward hardness of 8 and upon sheet steel, a Sward hardness of 6. The flexibility upon a conical mandrel was 20 percent or greater and the impact resistance was 5 inch pounds measured with a one-half inch steel ball.

*Example XXIII*

This example again illustrates the use of a diluent (xylene) in the reaction mixture.

The formulation of the interpolymer of this example was as follows:

| | Grams |
|---|---|
| Air blown linseed oil | 375 |
| Vinyl acetate | 750 |
| Vinyl chloride | 750 |
| Benzoyl peroxide | 37.5 |
| RN34 stabilizer | 37 |
| Xylene | 750 |

Acrylic acid—1 percent by weight based upon the interpolymerizable components.

The foregoing mixture was heated for 16 hours at 80° C. to provide a product which, upon distillation of excess monomer, contained 63 percent of combined monomer. This is about 43.5 percent of the total monomer. The product when diluted to a solids content of 55 percent by weight in xylene, had a viscosity of Z. The color of the product was 12 upon the Gardner color scale. Samples of this material when catalyzed with 0.3 percent of lead and 0.03 percent of cobalt calculated as metal, air dried upon panels of glass and metal respectively to hardnesses of 16 and 14 upon the Sward scale. The flexibility of the product upon a conical mandrel was greater than 20 percent and the impact resistance was greater than 11 inch pounds measured with a one-half inch steel ball.

*Example XXIV*

This example constitutes a typical coating composition formulation such as might be employed in coating iron or steel. The composition comprised an interpolymer resin of:

| | Grams |
|---|---|
| Linseed oil which had been blown to viscosity of Q and a peroxide value of 468 | 500 |
| Vinyl acetate | 500 |
| Vinyl chloride | 1500 |
| Benzoyl peroxide | 50 |

The mixture was heated for 8 hours at 75° C. This interpolymer resin when diluted with xylene to a solids content of 56.4 had a viscosity of X(Gardner-Holdt) and a color of 6 (Gardner).

This resin in a proportion of 55.8 parts by weight and rutile titanium dioxide in a proportion of 44.2 parts by weight were mixed with 47.8 parts xylene to provide a composition comprising 52.2 percent by weight of solids and 47.8 percent of the xylene. The mixing operation was performed on a conventional paint mill. During the mixing operation, 2 percent of a polyether type resin resulting from the condensation of bisphenol such as Bisphenol A and epichlorohydrin and being sold commercially by the Carbide & Carbon Chemicals Co. as A-5 stabilizer, along with a commercial dryer containing lead (0.3 percent) and cobalt (0.03 percent in terms of active metal) were added. These percentages are by weight and are based upon the total composition. A test panel of sheet steel was coated with this material and the film was then air dried. The film had good chemical resistance to such agencies as water, alkali, gasoline and alcohol. The flexibility and impact resistance were also excellent.

*Example XXV*

In this example, an interpolymer resin was prepared by heating to a temperature of 75° C. for a period of 8 hours a mixture comprising:

| | Grams |
|---|---|
| Linseed oil air blown to a viscosity of O+ and a peroxide value of 483 | 500 |
| Vinyl acetate | 500 |
| Vinyl chloride | 500 |

The resultant interpolymer had a viscosity of U—V on the Gardner-Holdt scale and had a color on the Gardner scale of 5 at a solids content of 57.7%.

The resultant interpolymer resin was formulated with pigments in the following composition:

| | Parts by weight |
|---|---|
| Resin | 29 |
| Melamine formaldehyde (Melmac 247-10 solids) | 2.8 |
| Whiting | 24.2 |
| Barytes | 16.3 |
| Hydrated clay | 16.9 |
| Lamp black | 0.3 |

This material in an amount of 69.3 parts by weight and 28.68 parts by weight of a solvent system comprising 95.5 percent of xylene and 4.5 percent of butanol, were mixed with 2.02 parts by weight of modifiers in a mixture comprising 40 percent by weight of aluminum stearate gel, 40 percent by weight of a 50 percent solution of lecithin in an aliphatic hydrocarbon solvent and 20 percent by weight of an anti-skinning agent which was the epoxide resin of low molecular weight previously referred to as A-5 stabilizer.

Test panels were coated with this composition and were cured for 90 minutes at 121° C. The resultant films had excellent resistance to salt spray and to high humidity. The flexibility and impact resistance were also very good.

*Example XXVI*

This example is essentially a repetition of Example V, but with a blown synthetic oil obtained by reacting linseed oil acids with pentaerythritol to form the corresponding substantially neutral ester and then blowing the ester to a peroxide value of about 50. This oil is mixed with vinyl chloride, vinyl acetate and benzoyl peroxide as in Example V and is interpolymerized to provide a useful coating material.

In this example other blown synthetic oils, such as those resulting from the replacement of pentaerythritol with polyols such as sorbitol, dipentaerythritol, dimethylol propane and others, may be employed. These synthetic oils may have peroxide values in a range of about 25 to 700.

In the examples, other vinyl esters such as vinyl formate, vinyl propionate or vinyl butyrate can be substituted for vinyl acetate. Other halides than vinyl chloride are expensive but for some purposes, may be desirable. These esters or halides such as vinyl iodide or bromide may be substituted stoichiometrically for all, or a part of the esters or chlorides.

The interpolymers containing blown oils, as disclosed in the examples can be formulated with solvents such as xylene, to desired viscosity and spread upon wood, metal, stone, brick or the like surfaces, and dried to hard, durable films.

The embodiments of the invention herein shown and described are to be considered as being by way of illustration. It will be apparent to those skilled in the art that numerous modifications may be made therein without departure from the spirit of the invention or the scope of the appended claims.

This application is a continuation-in-part of my copending application, Serial No. 386,395, filed October 15, 1953, and now abandoned.

I claim:

1. A method of forming a homogeneous xylene soluble interpolymer product suitable for use as a coating medium, which comprises heating in the substantial absence of diluents and under pressure at least equal to that autogenously generated by the reaction at a temperature in a range of about 50° C. to about 100° C., and in the substantial absence of added diluents for a period of about 1 to about 30 hours, an interpolymerizable mixture consisting essentially of (A) about 10 percent to about 30 percent by weight of blown, unsaturated glyceride oil of a peroxide value of about 25 to about 700, and being selected from the class consisting of blown linseed oil and blown soya oil, (B) about 70 percent to about 90 percent by weight of a monomer system consisting essentially of vinyl chloride and vinyl acetate, the vinyl chloride being present in an amount of about 70 percent to about 90 percent by weight of the total monomer system, the rest of the monomer system being vinyl acetate, and (C) an organic peroxide which is a catalyst of interpolymerization, heating being continued until at least 30 percent by weight of the total monomers have combined.

2. In a method of forming a homogeneous, xylene soluble interpolymer product suitable for use as a coating medium, the step which comprises heating to about 50° C. to about 100° C. and under a positive pressure of about 150 p.s.i. to about 250 p.s.i., and in the substantial absence of added diluents and for a period of about 1 to about 30 hours, an interpolymerizable mixture consisting essentially of (A) about 10 percent to about 30 percent by weight of blown glyceride drying oil, said oil being selected from the class consisting of blown linseed oil and blown soya oil, (B) about 70 percent to about 90 percent by weight of an essentially binary monomer system comprising about 20 percent to about 80 percent by weight of vinyl chloride, the rest of the monomer system being essentially vinyl acetate, and (C) an added organic peroxide which is a catalyst of interpolymerization, heating being continued until at least 30 percent by weight of the monomer system has combined.

3. In a method of forming a homogeneous, xylene soluble interpolymer product suitable for use as a coating medium, the step which comprises heating in the absence of added diluents and to about 50° C. to about 100° C. under autogenously generated pressure of the reaction mixture for about 1 to about 30 hours, an interpolymerizable mixture of (A) 10 percent to about 30 percent by weight of a blown glyceride drying oil of a peroxide value in a range of about 25 to 700, said oil being selected from the class consisting of blown linseed oil and blown soya oil, (B) about 70 percent to about 90 percent by weight of essentially binary monomer system which is about 20 percent to about 80 percent by weight vinyl chloride, the rest of the binary system being essentially vinyl acetate, and (C) an added organic peroxide catalyst of interpolymerization of the mixture in a range of about 0.5 percent to about 5 percent by weight based upon the interpolymerizable components, heating being continued until at least about 30 percent by weight of the monomer system has combined.

References Cited in the file of this patent

UNITED STATES PATENTS 1,975,959     Lawson et al.     Oct. 9, 1934

FOREIGN PATENTS 606,889     Great Britain     Aug. 23, 1948

UNITED STATES PATENT OFFICE

CERTIFICATE OF CORRECTION

Patent No. 2,926,153  February 23, 1960

Roger M. Christenson

It is hereby certified that error appears in the printed specification of the above numbered patent requiring correction and that the said Letters Patent should read as corrected below.

Column 1, line 47, for "therefore" read -- thereof --; column 8, line 74, for "Fllms" read -- Films --.

Signed and sealed this 11th day of April 1961.

(SEAL)
Attest:

ERNEST W. SWIDER
Attesting Officer

ARTHUR W. CROCKER
Acting Commissioner of Patents